Jan. 7, 1964
J. A. RILEY
3,116,808
PORTABLE DEER STAND
Filed March 12, 1962
2 Sheets-Sheet 2
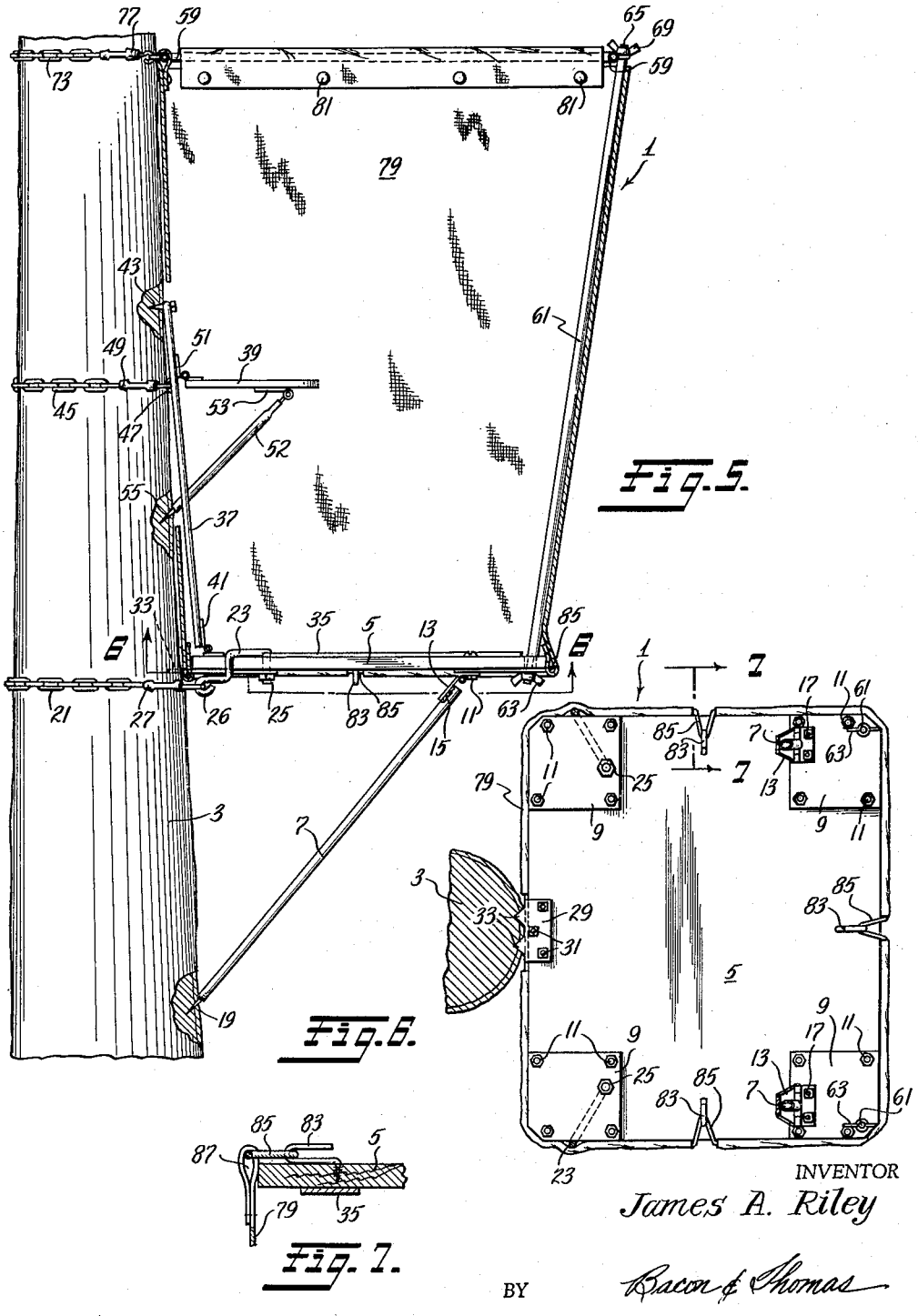
INVENTOR
James A. Riley
BY
Bacon & Thomas
ATTORNEYS 3,116,808
PORTABLE DEER STAND
James A. Riley, 1600 Rock St., Little Rock, Ark.
Filed Mar. 12, 1962, Ser. No. 179,141
5 Claims. (Cl. 182—129)

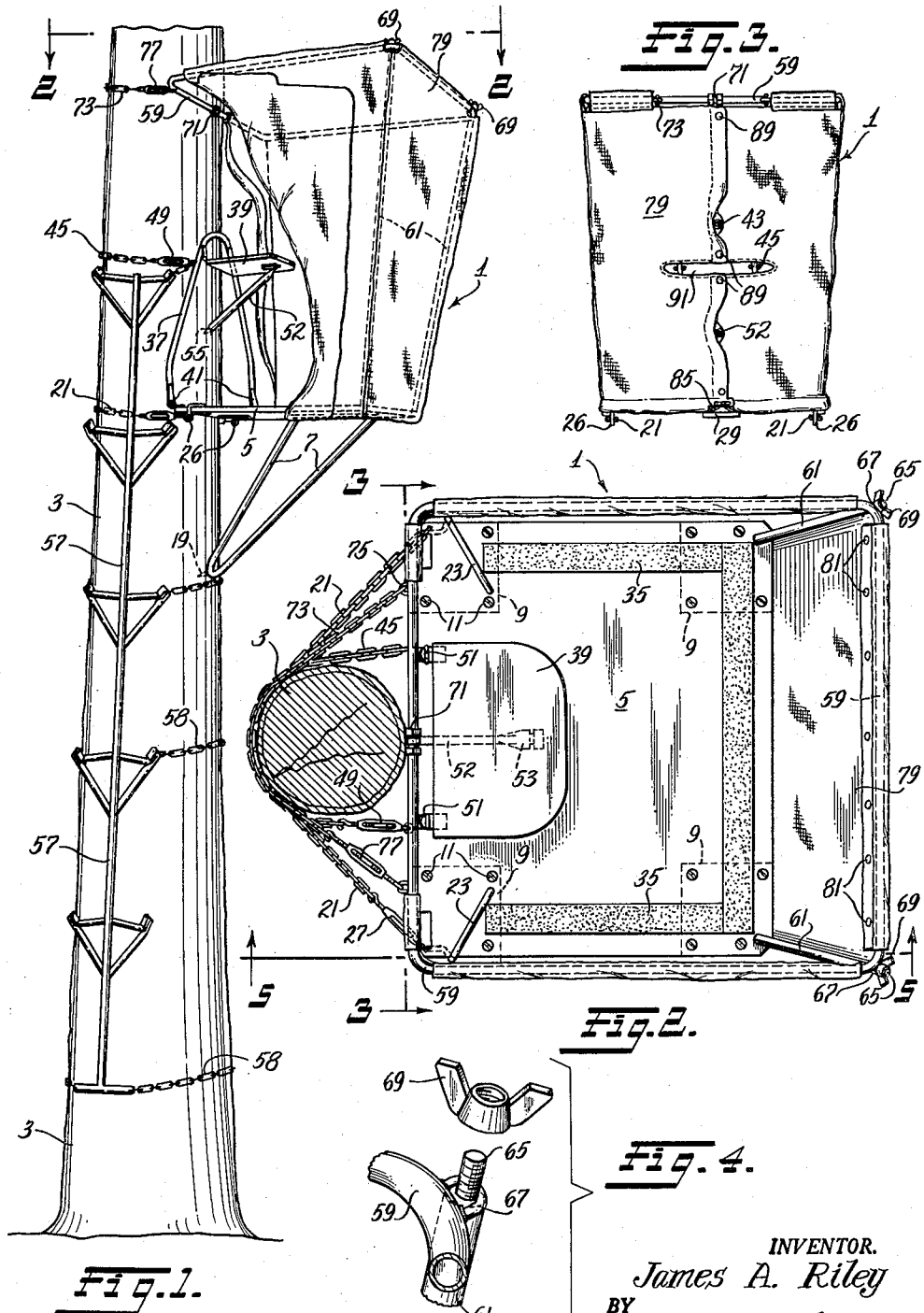

The present invention relates to improvements in platforms adapted to be secured to a tree, pole or other vertical body for supporting hunters in elevated position.

In the past, platforms for hunters have not been arranged to be collapsible and portable nor constructed with the comfort, convenience and safety of the occupant in mind. Instead, the structures employed for this purpose have been expensive to construct, cumbersome to transport or store, and uncomfortable and hazardous in use.

It is, therefore, an object of this invention to remedy the deficiencies in prior art structures and to provide a more comfortable, convenient and safer platform for hunters.

Another object of the invention is to provide a collapsible, portable platform, which is simple in construction and inexpensive to manufacture.

Another object is to provide a platform which is adapted to be quickly and easily installed at an elevated position on a tree or pole.

Another object is to provide a strong and rugged platform which is adapted to support a heavy load.

Another object is to provide a platform which is adapted to be secured to a tree or pole in such a manner as to prevent vertical movement thereof as well as lateral swinging of the platform about the tree.

Another object is to provide an enclosure for a platform to protect and camouflage the occupant.

These and other objects of the invention will become more apparent from the following specification when taken in conjunction with the drawings in which:

FIG. 1 is a perspective view of the portable shelter together with access thereto, shown installed in assembled position on a tree;

FIG. 2 is an enlarged horizontal plan view taken substantially on the line 2—2 of FIG. 1;

FIG. 3 is a rear elevational view taken on line 3—3 of FIG. 2, on a reduced scale;

FIG. 4 is an enlarged exploded perspective view of one of the corner connections of the shelter;

FIG. 5 is a vertical sectional view taken on the line 5—5 of FIG. 2;

FIG. 6 is a horizontal bottom sectional view taken on the line 6—6 of FIG. 5; and FIG. 7 is an enlarged fragmentary vertical sectional view taken on the line 7—7 of FIG. 6.

In order to illustrate one form of the present invention, the portable deer stand, generally designated by the numeral 1, is shown as being attached in an elevated position to a tree 3. The deer stand 1 includes a platform 5, which may be generally square in configuration and formed of plywood or any other suitable rigid material. The corners of the platform 5 are strengthened by attaching square, metal plates 9 to the lower surface of platform 5 by bolts 11 passing through openings formed in the plates and in platform 5. In order to support platform 5 in a horizontal position, a generally V-shaped brace 7 is pivotally secured at the upper ends thereof to the lower surface of platform 5 adjacent the front corners thereof by means of hinges 13. Brace 7 may be formed of tubular metal and the upper ends thereof may be secured to one side of hinges 13 as by means of welds 15. The other side of hinges 13 are secured to the lower surface of respective plates 9 by means of bolts 17 passing through openings formed in the hinges 13, plates 9 and platform 5. This brace 7 is mounted for pivotal movement from a position lying against the lower surface of platform 5 when the device is being transported or stored to a position wherein the lower end of the brace may engage the trunk of tree 3 when platform 5 is attached thereto. The lower end of V-shaped brace 7 is provided with one or more pointed projections 19 extending outwardly therefrom a sufficient distance to engage and penetrate into the tree in such a manner as to prevent downward movement of the brace and platform supported thereby.

Platform 5 is adapted to be secured to tree 3 by means of a chain 21 or other suitable flexible, non-extensible securing means. The rear corners of platform 5 are each provided with an eye bolt 23 of novel configuration, to which the opposite ends of chain 21 are secured. The inner, threaded end of each eye bolt 23 passes through aligned openings formed in platform 5 and in the respective rear corner plate 9 and is secured in position by a nut 25 threaded thereon. The body of each eye bolt 23, immediately above the surface of platform 5, is bent at right angles to lie against the upper surface of platform 5 and to extend outwardly toward the adjacent side of the platform 5 and slightly rearwardly thereof. The eye bolt is then bent downwardly to lie against the side edge of the platform and is finally bent inwardly and rearwardly to lie against the lower surface of the platform 5 with the eye 26 of the bolt 23 being disposed beneath the rear edge of platform 5. Chain 21 may be provided at one end with a hook, or the like, to pass through the eye 26 of one of bolts 23, while the other end of chain 21 is secured to the other eye bolt by means of a turnbuckle 27. The length of chain 21 may be varied to accommodate trees or poles of different diameter, the turnbuckle 27 serving to tighten the chain around the tree 3 to tightly clamp the back edge of platform 5 to the tree or post. In order to prevent vertical or lateral movement of the rear edge of platform 5 when it is attached to a tree or pole, a metal plate 29 is secured to the lower surface of platform 5 by means of bolts 31 passing through openings formed in plate 29 and in platform 5. The rear edge of plate 29 extends outwardly beyond the rear edge of platform 5 and is formed with prongs 33 which are adapted to penetrate the tree a distance sufficient to prevent movement of the rear edge of the platform 5 when the chain 21 is tightened to clamp the platform to the tree. It will be seen that by mounting eye bolts 23 on the platform in the manner described, a pivoting movement about the inner ends which pass through platform 5 is imparted to the eye bolts when chain 21 is tightened, causing the downturned portion of the bolts to grip the side edges of the platform 5 therebetween. This construction adds a safety factor to the means for fastening the platform to the tree as there is no tendency for the eye bolts to pull out of the platform, as would be the case if they were secured thereto in the conventional manner.

The upper surface of platform 5, which is adapted to support the occupant, may be provided with a strip of non-skid material 35 secured thereto along the side and front edges thereof. This non-skid material will prevent the feet of the occupant of the deer stand from sliding over the edges thereof in the event that the surface of the platform 5 is slippery. The non-skid material may be any conventional type available which provides an abrasive or anti-slip surface.

A support 37 of inverted, generally V-shaped configuration is secured to the upper surface of platform 5 adjacent the rear corners thereof in order to support a seat 39 in parallel relation above platform 5. The lower ends of support 37 are pivotally secured to platform 5 by means of hinges 41. One end of each hinge is bolted to the upper surface of platform 5 at the rear edge thereof while the other end of the hinge is welded to the lower end of the support. The support is thus mounted for pivotal movement from a position lying against the upper surface of platform 5 to a position normal thereto for securing the support to a tree. One or more prongs 43 may be provided on the rear surface of support 37 to penetrate the tree and assist in maintaining the deer stand against movement when secured in position. A chain 45 or other flexible, non-extensible securing means is attached at its opposite ends to eyes 47 which are attached to the rear surface of the legs of support 37. The chain 45 is provided at one end with a hook to engage one of the eyes 47, which the other end is provided with a turnbuckle 49 by means of which the length of the chain may be adjusted in order to tightly clamp support 37 to the tree and cause prong 43 to penetrate the body thereof.

The rear edge of seat 39 is pivotally attached to the front surface of support 37 by means of hinges 51 to permit the seat to pivot thereabout from a position lying against the front surface of support 37 to a position normal thereto. When the platform 5 is attached to tree 3 in the manner illustrated in the drawings with support 37 extending vertically upwardly from platform 5 and attached to tree 3 by chain 45, seat 39 is maintained in a horizontal position and substantially parallel to platform 5 by means of a support rod 52 pivotally connected to the lower surface of seat 39 adjacent the center of the front edge thereof by means of hinge 53. Support rod 52 is longer than the distance between the pivot point of hinge 53 and the rear edge of seat 39 and is formed at the lower end thereof with a spur 55 for engaging and penetrating the tree to support seat 39 in a substantially horizontal position.

The structure described thus far is adapted to be stored or transported in collapsed form with brace 7 lying against the lower surface of platform 5 and with support 37 and seat 39 lying against the upper surface of platform 5. A portable sectional ladder 57, as illustrated in FIG. 1, may be attached to tree 3 by means of chains 58 before erecting the deer stand thereon at the desired elevation. The deer stand may be installed on a tree by first encircling the tree with chain 21 and connecting the ends thereof to eyebolts 23 to secure platform 5 to the tree. The platform 5 is then raised to approximately a horizontal position and projection 19 on the lower end of brace 7 positioned against the trunk of tree 3. Chain 21 is then tightened by means of turnbuckle 27 to cause prongs 33 to penetrate the trunk of the tree and bring the rear edge of the platform 5 into contact therewith. Projection 19 is then caused to penetrate the trunk of the tree 3 by applying a force downwardly on platform 5. With the platform now securely attached to tree 3 in a horizontal position, support 37 is raised to an upright position and attached to tree 3 by means of chain 45. Turnbuckle 49 is tightened in order to force the rear surface of support 37 tightly into contact with the trunk of tree 3 and to cause prong 43 to penetrate the trunk. Seat 39 is next lifted to substantially a horizontal position and spur 55 at the lower end of support rod 52 is placed against the trunk of the tree. By downward force applied to seat 39, spur 55 will penetrate the trunk of tree 3 to maintain seat 39 in a horizontal position and to support the weight of the occupant of the deer stand thereon. It will be seen that the deer stand is securely attached to the tree to support the weight of the occupant on the platform or seat and that vertical or lateral movement of the stand with respect to tree 3 is prevented by the chains which encircle the tree as well as by the members which penetrate the trunk thereof.

The deer stand is provided with a safety rail and detachable closure to protect the occupant thereof and to assist in camouflaging the deer stand. A frame 59 of substantially the same configuration as the perimeter of platform 5 is supported in spaced relation above the platform by means of two support posts 61. The lower end of each post is reduced in diameter to provide a shoulder and the reduced portion is threaded. Openings are provided at the front corners of platform 5 through the platform and front corner plates 9 to receive the lower ends of posts 61. A wing nut 63 may be threaded onto the lower end of each post 61 in order to retain the posts in the openings. The upper ends of the posts are reduced in diameter and threaded, as indicated at 65, to pass through semi-circular eyes 67 attached to the outer surface of the front corners of frame 59. Wing nuts 69 secure the upper ends of posts 61 to frame 59. Frame 59, which may be formed of tubular material, is joined together at the opposite ends thereof by means of a pipe connector 71 disposed at the rear central portion of the frame. The portion of frame 59 may be attached to tree 3 by means of chain 73 attached at the opposite ends thereof to semi-circular eyes 75 welded or otherwise rigidly secured to the rear portion of frame 59. A turnbuckle 77 may be employed to tighten chain 73 to securely fasten the rear portion of frame 59 to the tree.

A flexible closure 79, formed of canvas, plastic or other suitable flexible material, is disposed about the sides of the deer stand whenever desirable to completely enclose the upper portion of platform 5 and seat 39. The upper edge of closure 79 may extend upwardly over the outer surface of frame 59 and be provided with snap fasteners 81 for attaching the upper edge of the closure to frame 59. Hooks 83 are attached to the lower surface of platform 5 adjacent the center of the front and side edges thereof in order to secure the lower edge of closure 79 to platform 5. A draw string 85 passes through the opening 87 formed in a hem at the lower edge of closure 79. By extending the lower edge of closure 79 to a position that is slightly below the lower surface of platform 5, draw string 85 may be looped around hooks 83 in the manner best illustrated in FIGS. 6 and 7 to secure the closure 79 to the platform 5. The walls of the closure 79 may be drawn taut by tightening the draw string and fastening the ends together. The ends of closure 79 are joined together at the rear of the deer stand by means of snap fasteners 89. The opposite ends of closure 79 are provided with a horizontal slit 91 midway between the upper and lower edges thereof in order to permit chain 45 to pass therethrough as the closure 79 is being opened or closed. Prong 43 and the lower end of support rod 51 may pass between the opposite ends of closure 79 when these ends are secured together by fasteners 89. The occupant of the deer stand may enter or leave through the opening provided between the opposite ends of closure 79 when snap fasteners 89 are detached.

The deer stand described above provides a safe and comfortable platform for a hunter. The closure 79 affords some protection from the elements as well as camouflaging for the hunter and platform. The seat 39 comfortably supports the occupant and the frame 59 may be employed as a weapon rest in the event that the occupant is hunting game.

The various modifications, alterations or equivalent structures which may occur to those skilled in the art are intended to be included within the scope of the present invention as defined in the appended claims.

I claim:

1. A portable deer stand for supporting a hunter in an elevated position on a tree comprising:
   (a) a platform adapted to be mounted on the tree and having front, rear and side edges;
   (b) non-skid material attached to the upper surface of said platform adjacent the front and side edges thereof;
   (c) the rear edge of said platform midway between said side edges having prongs extending outwardly therefrom for engaging the tree;
   (d) flexible non-extensible means secured at the opposite ends thereof to the rear edge of said platform for attaching said platform to the tree;
   (e) a V-shaped brace attached to the lower surface of said platform for maintaining said platform in a horizontal position on the tree;

(f) the upper ends of said brace being pivotally attached to said platform at points spaced inwardly from but adjacent to the front and side edges thereof, for pivotal movement of said brace from a position lying against the bottom surface of said platform to a position normal thereto;

(g) the lower end of said brace having a pointed projection extending outwardly therefrom for engaging the tree;

(h) an inverted V-shaped support attached to the upper surface of said platform for mounting a seat thereon;

(i) the lower ends of said support being pivotally attached to the upper surface of said platform at the rear edge thereof and adjacent said opposite side edges for pivotal movement of said support from a position lying against the upper surface of said platform to a position normal thereto;

(j) a prong extending outwardly from the rear surface of said support adjacent the upper end thereof for engaging the tree;

(k) flexible, non-extensible means secured at the opposite ends thereof to the rear surface of said support for attaching said support to the tree;

(l) a seat hingedly connected at the rear edge thereof to the front side of said support intermediate said upper and lower ends thereof for pivotal movement of said seat from a position lying against the front of said support to a position normal thereto;

(m) a support rod pivotally attached at the upper end thereof to the lower surface of said seat for supporting said seat in a position normal to said support and parallel to said platform;

(n) the lower end of said rod having a spur extending outwardly therefrom for engaging the tree;

(o) a frame of substantially the same configuration as the perimeter of said platform disposed in spaced relation above said platform for supporting a closure around said platform;

(p) support post means mounted on said platform at the front corners thereof and extending upwardly to support the front portion of said frame on the upper ends thereof;

(q) flexible, non-extensible means secured at the opposite ends thereof to the rear portion of said frame for attaching said frame to the tree, and (r) a flexible closure open at the top surrounding the upper surface of said platform and said seat;

(s) the upper edge of said closure being attached to said frame and the lower edge of said closure being attached to the lower surface of said platform adjacent the edges thereof;

(t) the opposite ends of said closure being detachably fastened together at the back of said stand midway between the side edges thereof, and (u) each end of said closure being formed with a horizontal slit for said seat support securing means to pass therethrough.

2. A portable deer stand for supporting a hunter in elevated position on a tree comprising:

(a) a platform adapted to be attached in horizontal position to the tree;

(b) the rear edge portion of said platform having prongs extending outwardly therefrom for engaging the tree;

(c) flexible, non-extensible means secured at the opposite ends thereof to the rear portion of said platform for attaching said platform to the tree;

(d) a V-shaped brace attached to the lower surface of said platform for suporting said platform in a horizontal position on the tree;

(e) the upper ends of said brace being pivotally attached to said platform adjacent the front edge thereof for pivotal movement of said brace from a position lying against the bottom surface of said platform to a position normal thereto;

(f) the lower end of said brace having a pointed projection extending outwardly therefrom for engaging the tree;

(g) a V-shaped support attached to the upper surface of said platform for mounting a seat thereon;

(h) the lower ends of said support being pivotally attached to the upper surface of said platform adjacent the rear edge thereof for pivotal movement of said support from a position lying against the upper surface of said platform to a position normal thereto;

(i) flexible, non-extensible means secured at the opposite ends thereof to the rear surface of said support for attaching said support to the tree;

(j) a seat hingedly connected at the rear edge thereof to the front side of said support for pivotal movement of said seat from a position lying against the front of said support to a position normal thereto; and (k) a support rod pivotally attached at the upper end thereof to the lower surface of said seat for supporting said seat in a position normal to said support and parallel to said platform;

(l) the lower end of said rod having a spur extending outwardly therefrom for engaging the tree at a point spaced below the rear edge of said seat.

3. A portable deer stand as defined in claim 2 including:

(m) a frame disposed in spaced relation above said platform;

(n) means attached to said platform and to said frame for supporting said frame above said platform; and (o) means for securing said frame to the tree.

4. A portable deer stand for supporting a hunter in an elevated position on a tree, comprising:

(a) a platform adapted to be attached in a horizontal position on one side of a tree;

(b) means for securing said platform to said tree;

(c) means for supporting said platform in a horizontal position on the tree;

(d) support means attached to said platform and extending upwardly therefrom for mounting a seat in spaced relation above said platform;

(e) a seat mounted on the upper end of said support means;

(f) means for supporting said seat in a substantially-horizontal position above said platform;

(g) means for securing said seat to said tree;

(h) a frame disposed in spaced relationship above said platform;

(i) means for securing said frame to said tree; and (j) means attached to said platform and to said frame supporting said frame above said platform.

5. A portable deer stand as defined in claim 4 wherein (k) a flexible closure is attached at the upper edge thereof to said frame and at the lower edge thereof to said platform enclosing the upper surface of said platform and said seat.

References Cited in the file of this patent

UNITED STATES PATENTS

| 2,074,586 | Heinrich | Mar. 23, 1937 |
| 2,775,489 | Hagadorn | Dec. 25, 1956 |
| 3,027,189 | Scott | Mar. 27, 1962 |